INVENTOR.
MAXWELL PEVAR

BY

ATTORNEY

INVENTOR.
MAXWELL PEVAR

BY

ATTORNEY

# United States Patent Office 3,203,229
Patented Aug. 31, 1965

3,203,229
PHOTOELASTIC LEAK DETECTION METHODS
Maxwell Pevar, Philadelphia, Pa., assignor to The Budd Company, Philadelphia, Pa., a corporation of Pennsylvania
Filed June 28, 1962, Ser. No. 205,947
3 Claims. (Cl. 73—40)

This invention pertains to methods for the direct photoelastic presentation of leak detection information and more particularly to such methods as adapted for the indication of very low fluid leakage rates under very low pressure differentials.

In many applications there is a need for sensitive leak detection methods for the presentation of qualitative and quantitative information indicating presence of fluid leakage, location of the leakage, and approximation of the magnitude of the leak. In the past, leak detection methods have ranged from the simple soap bubble tests to those tests which employ complicated instrumentation and special gases as working fluids. However, leak detection and the investigation of such small magnitude fluid flow rates in general, have been encumbered by the lack of sensitive methods applicable for surveillance over protracted periods of time and which directly provide information collected over extended areas.

Therefore, it is an object of this invention to provide novel fluid flow detection methods which are simple, inexpensive, efficient, and adapted for the direct presentation of information.

A more specific object is to provide leak detection methods which take advantage of directly readable photoelastic fringe pattern information and relate the same to the presence, location, and magnitude of fluid flow through an orifice and which require a minimum of auxiliary equipment for their application.

According to this invention an illustrated leak detection method for indicating the presence of fluid flow through an orifice within an extended area of a workpiece comprises the steps of: Providing a reflecting surface coextensive with the workpiece area, adhesively attaching a stratum of photoelastic material about the perimeter of the area to the workpiece, directing polarized light into the stratum, and analyzing polarized light directed out of the stratum, whereby variable photoelastic fringe patterns related to the presence of the fluid flow through any orifices within the given area of the workpiece are readily observable.

While the invention is particularly pointed out and distinctly claimed in the claims appended to this application, a better understanding thereof together with additional objects and advantages will be had upon consideration of the following specification taken in conjunction with the accompanying drawing wherein:

Figure 1:
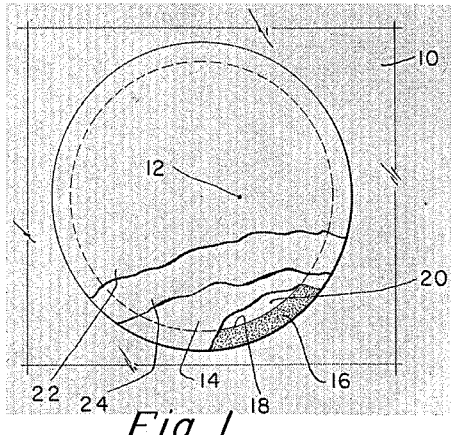
FIG. 1 and FIG. 2 are plan and cross-section views of photoelastic apparatus assembled on the wall of a pressure vessel for leak detection according to the methods of this invention.
Figure 2:
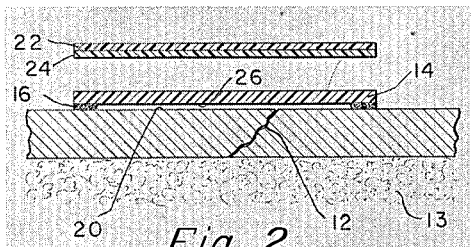

With particular reference to FIGS. 1 and 2, a workpiece 10, which may be the shell of a pressure vessel or another portion of a fluid confining apparatus, is illustrated as including a fine leakage orifice 12. A positive pressure differential, that is higher internal than external pressure, is assumed for the purposes of this example and the confined fluid 13 is assumed to be a gas although liquid leakage is, of course, readily detectable.

A testpiece stratum 14 of a photoelastic material, more specifically defined hereinafter, is attached by a ring of adhesive 16 to the surface of the workpiece 10, about the periphery 18 of the workpiece surface area to be investigated. Stratum 14 and adhesive 16 cooperate to entrap any fluid flowing through orifice 12.

A very simple form of polariscope is illustrated as comprising a sheet of plane polarizing material 22 and a quarter wave plate 24. The quarter wave plate is oriented at 45° with respect to the polarizing material so that the combination provides a circular polarizer for incident light and an analyzer for the polarized light emergent from the photoelastic stratum.

A reflecting surface interposed between stratum 14 and workpiece 10 may be constituted by the workpiece surface itself, modified by polishing when necessary, or by a reflecting coating applied to the inner surface 26 of photoelastic stratum 14 before its application to the workpiece.

Photoelastic materials, in general, are transparent materials which are initially isotropic but become anisotropic with respect to their optical properties under the influence of externally applied elastic effects. When such materials are stressed, incident polarized light is resolved into two mutually perpendicularly plane polarized components which travel through the photoelastic material at different velocities. The velocity difference is a function of principal stress difference and results in phase shifts between the transmitted light components. Upon subsequent analysis of the transmitted light, the phase differences between the then coplanar components result in interference fringe color pattern formations which are directly related to the external elastic influences upon the photoelastic material.

Suitable photoelastic materials for application according to the method of this invention include Bakelite, Celluloid, transparent natural and synthetic rubbers, various epoxy resins, and gelatine.

Figure 3:
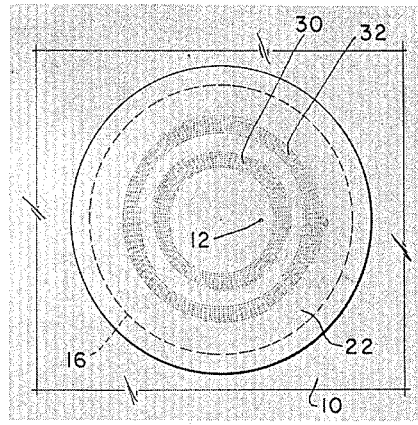
FIG. 3 and FIG. 4 are plan and cross-section views illustrating concepts of photoelasticity fringe pattern production in the assembly of FIGS. 1 and 2.
Figure 4:
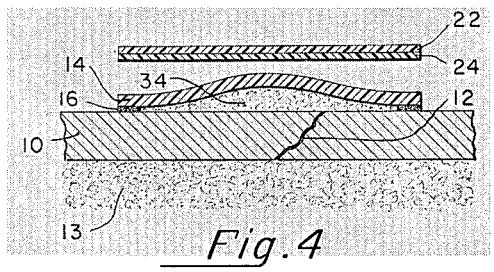

With reference now to the schematic illustration of FIGS. 3 and 4, the diffusion or flow of gas through orifice 12 into the space between photoelastic testpiece 14 and workpiece 10 causes deformation of the testpiece into a lenticular shape and develops internal stresses due to the stratum confinement by the adhesive bonding medium 16 at the periphery. The plan view of the distorted stratum, is shown in FIG. 3 as seen through the polariscope 22, 24, to indicate the development of circular isoclinic, constant color, fringes at 30 and 32. During their development the concentric fringes appear to originate at the outside of the field and to move radially inwardly therefrom and to be followed by succeeding fringes as the stratum deformation increases.

It should be sufficient here to point out that the visible fringe colors form a spectral order through the range of visible light colors and then are repeated through second and succeeding higher orders as deformation of testpiece 14 continues. Further details, however, of photoelastic fringe pattern formation may be had upon reference to such standard texts as Photoelasticity, M. M. Frocht, John Wiley and Sons, 1941.

The development of a fringe 32 requires little distortion of the stratum 14, and when low modulus photoelastic materials are employed, the distortion is begun as soon as pressure within the confined volume 34 exceeds the ambient pressure. Also exaggerated in the figures, is the thickness of the adhesive ring 16 which should be as thin as possible if rapid response is desired. It is only necessary that the adhesive provide an hermetic seal for volume 34 and edge restraint for testpiece 14. Further, no restriction is intended to the circular forms illustrated although the resultant symmetry of the fringe patterns is preferred for quantitative indications. The assembly may be employed over long periods of time, and inspection need only be intermittent since the indications are not transient and, to a degree, are enhanced by cumulative leakage. An equilibrium indication will finally be reached, however, due to the restoring stresses set up in the assembly and this indication will remain constant so long as ambient conditions are substantially invariant.

Figure 5:
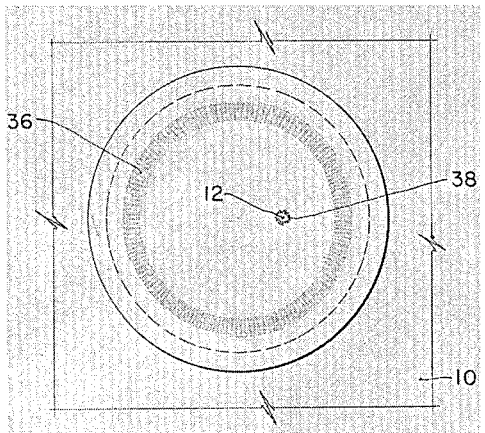
FIG. 5 and FIG. 6 are plan and cross-section views of the assembly of FIGS. 1 and 2 during a further step of the methods of this invention.

While the method so far described gives an indication of the existence of fluid flow and an indication of its magnitude, location of the orifice is known only to be within the enclosed area of the workpiece surface. Exact location is delineated, however, by the following procedure. After leakage has been grossly observed, the pressure differential across the workpiece 10 is reversed in sign, as by partial evacuation. The result is indicated in FIGS. 5 and 6.

Figure 6:
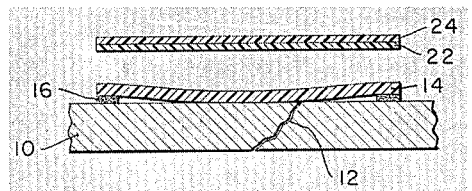

When the photoelastic stratum 14 is distorted downwardly as shown in FIG. 6, symmetrical fringes may develop as shown at 36 in the plan view of FIG. 5, again an indication that fluid flow through workpiece 10 is taking place. More significantly, however, as stratum 14 is compressed against the workpiece surface a localized fringe pattern 38 is generated in the immediate vicinity of orifice 12 to pinpoint its location.

It should be noted that evacuation is employed only after the existence of a leakage orifice has been established. Up to that point the investigation may have proceeded under the ordinary conditions of service of the pressure vessel or other fluid pressure confining workpiece. Of course, when the workpiece is a vacuum chamber or the like, the conditions of FIG. 5 and FIG. 6 obtain without preliminaries. The gross indication of fluid flow out of the space confined beneath testpiece 14 is the appearances of concentric peripheral fringes as at 36, followed by the precise delineation of any orifice positions by localized fringe patterns as at 38.

Figure 7:
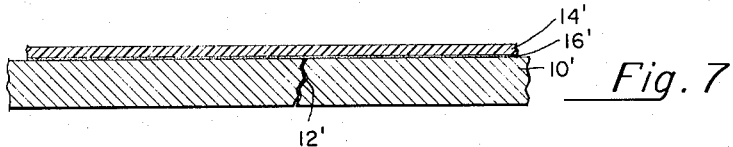
FIG. 7 illustrates an alternative to the leak detection methods explained in connection with the previous illustrations.

Whenever the gross indications of fluid flow may be dispensed with, the modification illustrated in FIG. 7 may be employed advantageously. This variation employs a photoelastic testpiece 14' which is bonded throughout its surface to the workpiece 10' by means of a coextensive adhesive layer 16'. Again, a reflecting surface is provided between testpiece 14' and workpiece 10', by the workpiece surface, by a coating on the undersurface of the testpiece, or by a reflecting adhesive. The simple polariscope previously described may be used to inspect the testpiece for fringe pattern production. For both positive and negative pressure differentials, a localized fringe pattern (38 of FIG. 5) is the indication of the presence and location of a leakage orifice.

Figure 8:
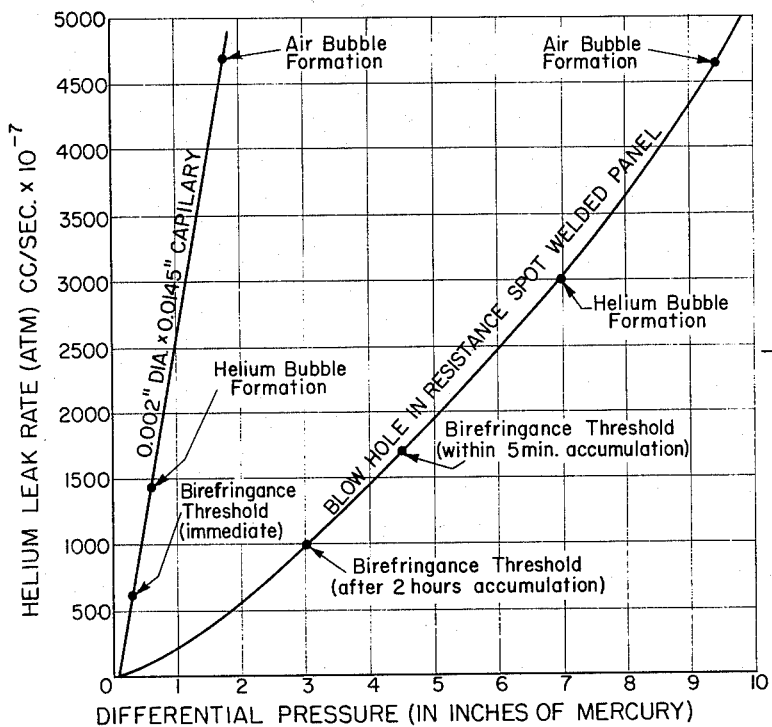
FIG. 8 illustrates a sensitivity comparison among alternative leak detection methods.

The graphical presentation of FIG. 8 gives the results of an experimental comparison of the leak detection methods of this invention with prior methods. Calibrated orifices were employed as simulated leakage paths and the pressure differential between that of an internal fluid under compression and external atmospheric pressure was varied from zero by small steps until the leak detection thresholds of the various methods were established.

Observed helium leakage rate versus differential pressure (positive) was plotted for an artificial capillary and for a natural defect in a pressure vessel shell to define initial conditions. A photoelastic assembly like that of FIGS. 1 and 2 was applied over each orifice and then observed continuously for the appearance of informative fringe patterns. Later, a one-half inch water layer was substituted and first helium and air bubble formations observed and recorded.

It is important to note that short exposure time thresholds for photoelastic indications are superseded in sensitivity by the corresponding longer exposure time equilibrium thresholds. It is a distinct advantage of the photoelastic methods of this invention that the leak detection means may remain in operative position without attention and will accumulate a deformation which varies directly with time in its correlation with the leakage magnitude. A limiting condition is provided by the structural properties of the photoelastic material, determined in this instance by the material's elastic modulus. Materials with lower elastic moduli will be deformed more in response to a given applied fluid pressure differential before equilibrium is reached and a balance established between the internal restoring stresses of the stratum and the applied forces.

Perhaps the most sensitive photoelectric material from the standpoint of high forced-birefringence sensitivity and low elastic modulus is gelatine. An aqueous gelatine, comprising 61% gelatine, 13% glycerine and the remainder water, may be cast into uniform thickness sheets with little difficulty and itself provide for adhesion with a workpiece. Such a material will exhibit one fringe order for each .07 lb. per square inch principal stress difference per inch of thickness and has an elastic modulus of 7 p.s.i. or less. Other convenient materials range in order of increasing elastic moduli through urethane plastics, epoxy resin plastics, bakelite and celluloid, the latter having elastic modulus of about $3 \times 10^7$ p.s.i. and requiring a principal stress difference of 13.9 lbs. per square inch of thickness per fringe order.

While calibration of photoelastic leak detection means may be readily accomplished by the application over calibrated orifices as described above, the apparatus of FIG. 9 is useful for the comparison of material sensitivities. A confined fluid pressure environment is provided with a threaded tubulation 50 and a coupling 52 having a calibrated orifice 54 at its outer end. A co-operatively threaded bell 56 is adapted for the orientation of a photoelastic testpiece 58 normal to the orifice 54 by means of a cap ring 60. Under a positive or negative pressure differential the testpiece 58 will deform and give rise to a photoelastic indication as described above.

Figure 9:
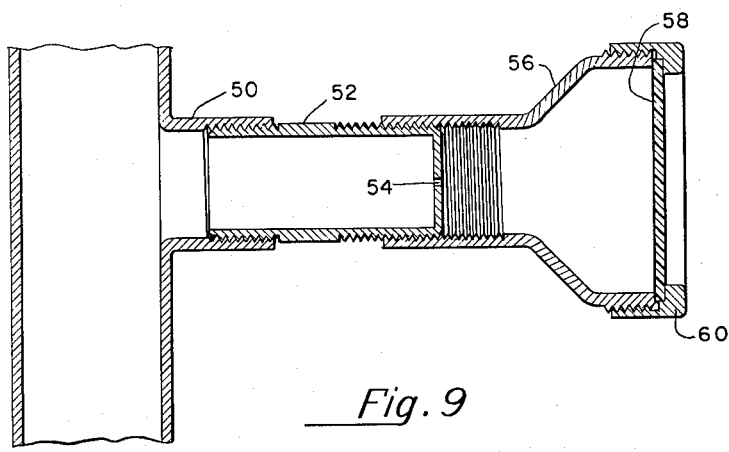
FIG. 9 illustrates a further modification useful in the analysis of fluid flow or leakage and in the calibration of means for application according to the methods of this invention.

Besides being useful in the calibration of photoelastic materials for application in specific leak detection methods, the apparatus of FIG. 9 in itself provides a very advantageous means for the direct visual observation of fluid pressure differential, of fluid flow parameters, and other aspects of fluid transport.

While there have been shown and described what are at present believed to be preferred embodiments of this invention, no restriction is implied by the description of specific means or methods and there is no intention to restrict the scope of this invention beyond that of the appended claims.

What is claimed is:

1. The method of detecting and locating fluid leakage through a given extended area of the wall of a high pressure vessel to the atmosphere, which method comprises the steps of: providing a reflecting surface coextensive with the given area, attaching a testpiece of photoelastic material about the entire perimeter of the given area to the workpiece by means providing a fluid tight enclosure of said area, directing polarized light into the testpiece and analyzing polarized light directed out of the testpiece to generate directly observable fringe patterns related to the presence of fluid leakage through any orifices within the given area of the workpiece, and thereafter evacuating the pressure vessel to generate localized fringe patterns at the positions of said any orifices for precisely indicating the location thereof within the given area.

2. The method of detecting fluid flow through an orifice within a given area of a workpiece such as a pressure vessel subjected to differential pressure, which method comprises the steps of: providing a reflecting surface substantially parallel and coextensive with the given area, attaching a testpiece of photoelastic material about the entire perimeter of the given area to the workpiece by means providing a fluid tight enclosure of said area, said fluid flow through said orifice between said enclosure and said vessel creating a pressure site at the photoelastic material-workpiece interface to cause said photoelastic material to bulge relative to said given area of the workpiece, passing polarized light substantially normally into and through the testpiece to the reflecting surface, and analyzing polarized light directed through and out of the testpiece from the reflecting surface, whereby directly observable photoelastic fringe patterns are related to the bulge formation due to the presence of the fluid flow through any orifice within the given area of the workpiece.

3. The method of detecting fluid flow through an orifice within a given area of a workpiece such as a pressure vessel subjected to differential pressure, which method comprises the steps of: attaching a testpiece of photoelastic material to the workpiece throughout the given area by a reflecting adhesive bonding layer, coextensive with the testpiece to provide a fluid tight enclosure of said area, said fluid flow through said orifice between said enclosure and said vessel creating a pressure site at the photoelastic material-workpiece interface to cause said photoelastic material to bulge relative to said given area of the workpiece, passing polarized light substantially normally into and through the testpiece to said reflecting adhesive bonding layer, and analyzing polarized light directed through and out of the testpiece from said reflecting adhesive layer, whereby directly observable photoelastic fringe patterns are related to the deflection of the photoelastic material due to the presence of fluid flow through any orifice within the given area of the workpiece.

References Cited by the Examiner
UNITED STATES PATENTS

| | | | |
|---|---|---|---|
| 2,415,436 | 2/47 | Maris | 88—14 |
| 2,625,850 | 1/53 | Stanton | 73—88 X |
| 3,040,583 | 6/62 | Post | 73—398 |
| 3,043,129 | 7/62 | King | 73—40 |

ISAAC LISANN, *Primary Examiner*.